United States Patent
Yu et al.

(10) Patent No.: US 12,470,353 B2
(45) Date of Patent: Nov. 11, 2025

(54) METHOD OF DERIVING QCL ASSUMPTION IN MULTI-PANEL TRANSMISSION AND RELATED DEVICE

(71) Applicant: Hannibal IP LLC, Frisco, TX (US)

(72) Inventors: Chia-Hao Yu, Yilan (TW); Yu-Hsin Cheng, Hsinchu (TW)

(73) Assignee: Hannibal IP LLC

( * ) Notice: Subject to any disclaimer, the term of this patent is extended or adjusted under 35 U.S.C. 154(b) by 305 days.

(21) Appl. No.: 18/086,001

(22) Filed: Dec. 21, 2022

(65) Prior Publication Data

US 2023/0155785 A1    May 18, 2023

Related U.S. Application Data

(63) Continuation of application No. 16/842,642, filed on Apr. 7, 2020, now Pat. No. 11,683,142.
(Continued)

(51) Int. Cl.
*H04L 5/00* (2006.01)
*H04W 72/23* (2023.01)

(52) U.S. Cl.
CPC ........... *H04L 5/0053* (2013.01); *H04W 72/23* (2023.01)

(58) Field of Classification Search
CPC ............................ H04L 5/0053; H04W 72/23
See application file for complete search history.

(56) References Cited

U.S. PATENT DOCUMENTS

| 11,457,511 | B2 | 9/2022 | Panteleev et al. |
| 11,683,142 | B2 | 6/2023 | Yu et al. |

(Continued)

FOREIGN PATENT DOCUMENTS

| CN | 108199819 | 6/2018 |
| CN | 114051705 | 2/2022 |

(Continued)

OTHER PUBLICATIONS

Non-Final Office Action issued by State Intellectual Property Office of People's Republic of China, on May 25, 2023 for corresponding Chinese Patent Appliction No. 202080037747A.
(Continued)

*Primary Examiner* — Ronald B Abelson
(74) *Attorney, Agent, or Firm* — Cole Schotz, P.C.; Marcella M. Bodner (57) ABSTRACT

A method of deriving a Quasi-CoLocation (QCL) assumption for a user equipment (UE) in multi-panel transmission is disclosed. The method comprises obtaining a plurality of control resource set (CORESET) groups from a network of the wireless communication system, determining a default QCL assumption for demodulation reference signal (DM-RS) port(s) of at least one physical downlink share channel (PDSCH), reception scheduled by a scheduling physical downlink control channel (PDCCH) according to a CORESET of one of the plurality of CORESET groups when a time offset between a reception of downlink control information (DCI), in the scheduling PDCCH and the at least one PDSCH reception is less than a threshold, wherein at least one of the plurality of CORESET groups includes at least one CORESET for indicating a QCL assumption, and applying the default QCL assumption for reception of the DM-RS port(s) of the at least one PDSCH.

16 Claims, 5 Drawing Sheets

Related U.S. Application Data (60) Provisional application No. 62/830,667, filed on Apr. 8, 2019.

(56) References Cited

U.S. PATENT DOCUMENTS

| | | | |
|---|---|---|---|
| 2018/0132243 A1 | 5/2018 | Yang et al. | |
| 2018/0343653 A1 | 11/2018 | Guo | |
| 2019/0342907 A1* | 11/2019 | Huang | H04W 72/23 |
| 2020/0052844 A1* | 2/2020 | Yu | H04L 5/0051 |
| 2020/0154467 A1 | 5/2020 | Gong | |
| 2020/0267712 A1 | 8/2020 | Cirik | |
| 2020/0288344 A1 | 9/2020 | Zhang | |
| 2020/0288417 A1 | 9/2020 | Harada | |
| 2020/0322109 A1 | 10/2020 | Yu et al. | |

FOREIGN PATENT DOCUMENTS

| | | |
|---|---|---|
| CN | 114051705 B | 4/2024 |
| CN | 118300654 A | 7/2024 |
| EP | 3944699 A1 | 1/2022 |
| EP | 3954081 | 2/2022 |
| IN | 202147050793 | 12/2021 |
| WO | 2019031850 | 2/2019 |
| WO | 2020207374 | 10/2020 |

OTHER PUBLICATIONS

Search Report for Non-Final Office Action, issued by State Intellectual Property Office of People's Republic of China, on May 25, 2023, for corresponding Chinese Patent Appliction No. 202080037747A.

Notice of Allowance for corresponding Chinese Patent Application No. 2020800377478, issued on Feb. 1, 2024.

English translation of Notice of Allowance for corresponding Chinese Patent Application No. 2020800377478, issued on Feb. 1, 2024.

Final Examination Report issued on Oct. 3, 2023, for corresponding Indian Patent Application No. 202147050793.

Chinese Patent Certificate No. 114051705, issued by the State Intellectual Property Office of the People's Republic of China on Apr. 26, 2024, for corresponding Chinese Patent Application No. 20208037747.

English translation of Notice of Publication for Chinese Publication No. 118300654 issued on Jul. 5, 2024 for corresponding Chinese Patent Application No. 202410388796.

Notice of Publication for Chinese Publication No. 118300654 issued on Jul. 5, 2024 for corresponding Chinese Patent Application No. 202410388796.

Hearing Notice issued on Aug. 21, 2024, for corresponding Indian Patent Application No. 202147050793.

Communication under Rule 71(3) EPC issued on Oct. 17, 2024 for corresponding European Patent Application No. 20788035.2.

Ericsson: "Feature lead summary for beam management—Thursday", Tdoc R1-1809864, 3GPP TSG-RAN WG1 Meeting # 94 Gothenberg, Aug. 20-Aug. 24, 2018.

Extended European Search Report issued on Aug. 16, 2022 for corresponding European Patent Application No. 20788035.2.

International Preliminary Report on Patentability issued on Sep. 28, 2021, for International Patent Application No. PCT/CN2020/083484.

International Search Report issued on Jun. 30, 2020 for International Patent Application No. PCT/CN2020/083484.

Written Opinion of the International Searching Authority issued on Jun. 30, 2022, for International Patent Application No. PCT/CN2020/083484.

English translation of electronic filing receipt for Chinese Patent Application No. 10000522393060, filed on Apr. 1, 2024.

English translation of transmittal for CN10000522393060, filed on Apr. 1, 2024.

Electronic filing receipt for Chinese Patent Application No. 10000522393060, filed on Apr. 1, 2024.

Transmittal sheet for CN10000522393060, filed on Apr. 1, 2024.

Chinese Patent Application No. 10000522393060, filed on Apr. 1, 2024.

Non-Final Office Action issued on Jul. 23, 2021 for corresponding U.S. Appl. No. 16/842,642.

Final Office Action issued on Jan. 18, 2022 for corresponding U.S. Appl. No. 16/842,642.

Advisory Action issued on Apr. 1, 2022 for corresponding U.S. Appl. No. 16/842,642.

Notice of Allowance issued on Sep. 26, 2022 for correspnding U.S. Appl. No. 16/842,642.

3GPP TS 38.213 V16.1.0; Physical layer procedures for control; pp. 1-156, Mar. 2020.

3GPP TS 38.214 V16.1.0; Physical layer procedures for data; pp. 1-151, Mar. 2020.

3GPP TS 38.331 V16.0.0; Radio Resources Control (RRC) protocol specification, pp. 1-835, Mar. 2020 (835 pgs, submitted as 9 pdf files).

3GPP TS 38.331 V15.7.0; Radio Resources Control (RRC) protocol specification, pp. 1-527, Sep. 2019 (527 pgs, submitted as 3 pdf files).

3GPP TS 38.331 V15.4.0; Radio Resources Control (RRC) protocol specification, pp. 1-474, Dec. 2018 (474 pgs, submitted as 3 pdf files).

3GPP TS 38.213 V15.4.0; Physical layer procedures for control, pp. 1-104, Dec. 2018.

* cited by examiner

METHOD OF DERIVING QCL ASSUMPTION IN MULTI-PANEL TRANSMISSION AND RELATED DEVICE

CROSS-REFERENCE TO RELATED APPLICATION(S)

The present application is a continuation of U.S. patent application Ser. No. 16/842,642, filed on Apr. 7, 2020, now allowed and which claims the benefit of and priority to U.S. provisional Patent Application Ser. No. 62/830,667 filed on Apr. 8, 2019, entitled "Panel-specific Fallback Mechanism for PDSCH Spatial Receiving Filter," (hereinafter referred to as "the '667 provisional"). The disclosure of the '667 provisional is hereby incorporated fully by reference into the present disclosure.

FIELD

The present disclosure generally relates to wireless communications, and more particularly, to a method of deriving Quasi-CoLocation (QCL) assumption in multi-panel transmission and a related device.

BACKGROUND

NR Rel-15 supports beam management with Transmission Configuration Indication (TCI) framework, by which different types of QCL assumption is indicated. Among these QCL types, QCL-typeD is related to spatial receiving characteristics that can be utilized by a user equipment (UE) for receiving a target reference signal/channel.

For physical downlink (DL) shared channel (PDSCH) reception, QCL-typeD (i.e. beam scheme) can be indicated in a physical DL control channel (PDCCH) payload. However, before DL control information (DCI) of the PDCCH is parsed, the UE does not know a default beam for PDSCH reception, as illustrated in FIG. 1, which is a schematic diagram illustrating relation between PDSCH scheduling delay and DCI parsing latency.

Figure 1:
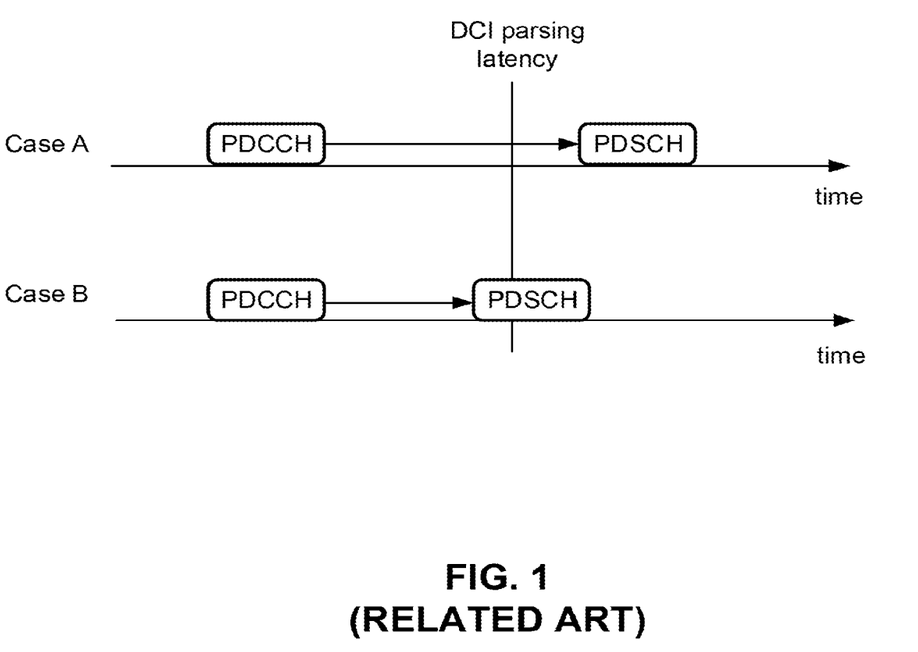
FIG. 1 is a schematic diagram illustrating a relationship between PDSCH scheduling delay and DCI parsing latency, in accordance with related art methods.

As shown in FIG. 1, PDSCH scheduling latency is longer than DCI parsing latency in case A, so that the QCL-typeD indicated in the PDCCH can be utilized for receiving the scheduled PDSCH. However, for case B, PDSCH scheduling latency is shorter than DCI parsing latency, which results in the UE not being able to obtain QCL-typeD in time for PDSCH reception.

SUMMARY

The present disclosure is directed to a method of deriving QCL assumption in multi-panel transmission and a related device.

According to an aspect of the present disclosure, a method of deriving a Quasi-CoLocation (QCL) assumption in multi-panel transmission for a user equipment (UE) is disclosed. The method comprises obtaining a plurality of control resource set (CORESET) groups from a network of a wireless communication system, determining a default QCL assumption for demodulation reference signal (DM-RS) port(s) of at least one physical downlink shared channel (PDSCH) reception scheduled by a scheduling physical downlink control channel (PDCCH) according to a CORESET of one of the plurality of CORESET groups, when a time offset between a reception of downlink control information (DCI) in the scheduling PDCCH and the at least one PDSCH reception is less than a threshold, wherein at least one of the plurality of CORESET groups includes at least one CORESET indicating the QCL assumption, and applying the default QCL assumption for reception of the DM-RS port(s) of the at least one PDSCH.

According to another aspect of the present disclosure, a user equipment (UE) for deriving Quasi-CoLocation (QCL) assumption in multi-panel transmission is disclosed. The UE comprises a processor, for executing computer-executable instructions, and a non-transitory machine-readable medium, coupled to the processor, for storing the computer-executable instructions, wherein the computer-executable instructions instruct the processor to obtain a plurality of control resource set (CORESET) groups from a network of a wireless communication system, determine a default QCL assumption for demodulation reference signal (DM-RS) port(s) of at least one physical downlink shared channel (PDSCH) reception scheduled by a scheduling physical downlink control channel (PDCCH) according to a CORESET of one of the plurality of CORESET groups when a time offset between a reception of downlink control information (DCI) in the scheduling PDCCH and the at least one PDSCH reception is less than a threshold, wherein at least one of the plurality of CORESET groups includes at least one CORESET indicating the QCL assumption, and apply the default QCL assumption for reception of the DM-RS port(s) of the at least one PDSCH.

BRIEF DESCRIPTION OF THE DRAWINGS

Aspects of the exemplary disclosure are best understood from the following detailed description when read with the accompanying figures. Various features are not drawn to scale, dimensions of various features may be arbitrarily increased or reduced for clarity of discussion.

DETAILED DESCRIPTION

The following description contains specific information pertaining to exemplary implementations in the present disclosure. The drawings and their accompanying detailed description are directed to exemplary implementations. However, the present disclosure is not limited to these exemplary implementations. Other variations and implementations of the present disclosure will occur to those skilled in the art. Unless noted otherwise, like or corresponding elements in the figures may be indicated by like or corresponding reference numerals. Moreover, the drawings and illustrations are generally not to scale and are not intended to correspond to actual relative dimensions.

For the purpose of consistency and ease of understanding, like features are identified (although, in some examples, not shown) by numerals in the exemplary figures. However, the features in different implementations may be different in other respects, and therefore shall not be narrowly confined to what is shown in the figures.

The phrases "in one implementation," and "in some implementations," may each refer to one or more of the same or different implementations. The term "coupled" is defined as connected, whether directly or indirectly via intervening components, and is not necessarily limited to physical connections. The term "comprising" means "including, but not necessarily limited to" and specifically indicates open-ended inclusion or membership in the described combination, group, series and equivalents.

Additionally, for the purposes of explanation and non-limitation, specific details, such as functional entities, techniques, protocols, and standards are set forth for providing an understanding of the described technology. In other examples, detailed description of well-known methods, technologies, system, and architectures are omitted so as not to obscure the description with unnecessary details.

Persons skilled in the art will recognize that any described network function(s) or algorithm(s) may be implemented by hardware, software or a combination of software and hardware. Described functions may correspond to modules that are software, hardware, firmware, or any combination thereof. The software implementation may comprise computer executable instructions stored on computer readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of applications specific integrated circuitry (ASIC), programmable logic arrays, and/or using one or more digital signal processor (DSPs). Although some of the disclosed implementations are directed to software installed and executing on computer hardware, alternative implementations as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc (CD) read-only memory (CD ROM), magnetic cassettes, magnetic tape, magnetic disk storage, or any other equivalent medium capable of storing computer-readable instructions.

A radio communication network architecture (e.g. a long term evolution (LTE) system, an LTE-Advanced (LTE-A) system, an LTE-A Pro system, or an New Radio system) typically includes at least one base station (BS), at least one UE, and one or more optional network elements that provide connection with a network. The UE communicates with the network (e.g. a core network (CN), an evolved packet core (EPC) network, an Evolved Universal Terrestrial (ET) Radio Access Network (RAN) (E-UTRAN), a Next-Generation (NG) Core (NGC), 5G CN (5GC), or an internet via a RAN established by the BS.

It should be noted that, in the present disclosure, a UE may include, but is not limited to, a mobile station, a mobile terminal or device, a user communication radio terminal. For example, a UE may be a portable radio equipment, that includes, but is not limited to, a mobile phone, a tablet, a wearable device, a sensor, or a personal digital assistant (PDA) with wireless communication capability. The UE is configured to receive and transmit signals over an air interface to one or more cells in a RAN.

A BS may include, but is not limited to, a node B (NB) as in the Universal Mobile Telecommunication System (UMTS), an evolved node B (eNB) as in the LTE-A, a radio network controller (RNC) as in the UMTS, a BS controller (BSC) as in the Global System for Mobile communications (GSM,)/GSM EDGE RAN (GERAN), an NG-eNB as in an E-UTRA BS in connection with the 5GC, a next generation node B (gNB) as in the 5G-RAN, and any other apparatus capable of controlling radio communication and managing radio resources within a cell. The BS may connect to serve the one or more UEs via a radio interface to the network.

A BS may be configured to provide communication services according to at least one of the following radio access technologies (RATs): Worldwide Interoperability for Microwave Access (WiMAX), GSM(often referred to as 2G), GERAN, General Packet Radio Service (GRPS), UMTS (often referred to as 3G) according to basic wide-band-code division multiple access (W-CDMA), high-speed packet access (HSPA), LTE, LTE-A, evolved LTE (eLTE), New Radio (NR, often referred to as 5G), and/or LTE-A Pro. However, the scope of the present disclosure should not be limited to these protocols.

The BS is operable to provide radio coverage to a specific geographical area using a plurality of cells forming the RAN. The BS supports the operations of the cells. Each cell is operable to provide services to at least one UE within radio coverage of the cell. More specifically, each cell (often referred to as a serving cell) provides services to serve one or more UEs within the cell's radio coverage, (e.g. each cell schedules the DL and optionally uplink (UL) resources to at least one UE within the cell's radio coverage for DL and optionally UL packet transmissions). The BS can communicate with one or more UEs in the radio communication system via the plurality of cells. A cell may allocate sidelink (SL) resources for supporting proximity service (ProSe). Each cell may have overlapped coverage areas with other cells.

Figure 2:
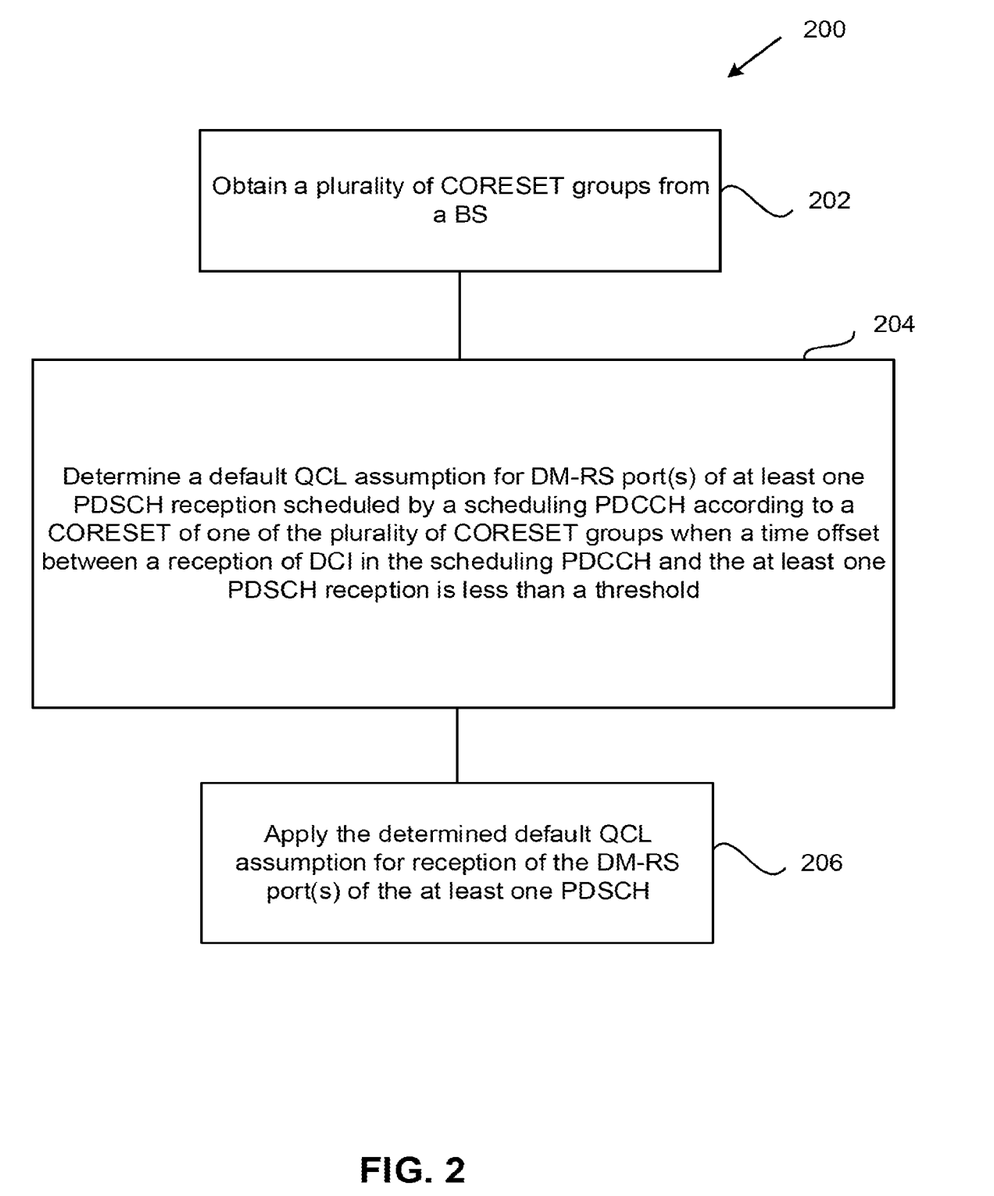
FIG. 2 is a flowchart illustrating a method for a UE to perform QCL assumption operation in multi-panel transmission, in accordance with example implementations of the present disclosure.

FIG. 2 illustrates a method 200 for a UE to perform QCL assumption derivation in multi-transmit-receive point (TRP) (multi-TRP)/panel transmission according to the present disclosure. In action 202, the UE obtains a plurality of control resource set (CORESET) groups from a BS. In action 204, the UE determines a default QCL assumption for DM-RS port(s) of at least one PDSCH reception scheduled by a scheduling PDCCH according to a CORESET of one of the plurality of CORESET groups when a time offset between a reception of DCI in the scheduling PDCCH and the at least one PDSCH reception is less than a threshold, where the CORESET group includes at least one CORESET for indicating a QCL assumption. In action 206, the UE applies the default QCL assumption for reception of the DM-RS port(s) of the at least one PDSCH.

The method 200 achieves UE-based QCL assumption. In detail, multiple CORESET groups are configured to the UE, and CORESET(s) in a CORESET group are associated to the same transmit-receive point, TRP. A default QCL assumption (e.g. beam scheme) for PDSCH reception is determined according to a QCL type-D of individual groups of CORESET(s) when the time offset between the reception of DCI in the PDCCH and the PDSCH reception is less than the threshold (e.g. the PDSCH scheduling delay is less than the DCI parsing latency). In other words, a panel-specific default beam is determined according to a group of CORE- SET(s) belonging to a same TRP. Default beams for PDSCH receptions from different TRPs are independently determined according to each of the CORESET groups.

It is noted that, one PDCCH may be utilized to schedule one PDSCH or a plurality of PDSCHs, which is not limited in QCL assumption derivation. It is noted that the term "beam" refers to QCL assumption made by the UE. QCL parameters include a plurality of types in NR. QCL type-D is usually referred to by the term "beam." For receiving a signal/channel properly, other QCL parameter types may also be needed. However, when deriving a QCL type-D assumption, other QCL parameters are derived by following a similar approach as for deriving a QCL type-D assumption. In this document, "beam" is utilized to express a QCL type-D assumption or QCL parameters interchangeably. It is noted that when referring to QCL type-D specifically, "beam" can be also expressed as "spatial filter." Various cases are disclosed.

Figure 3:
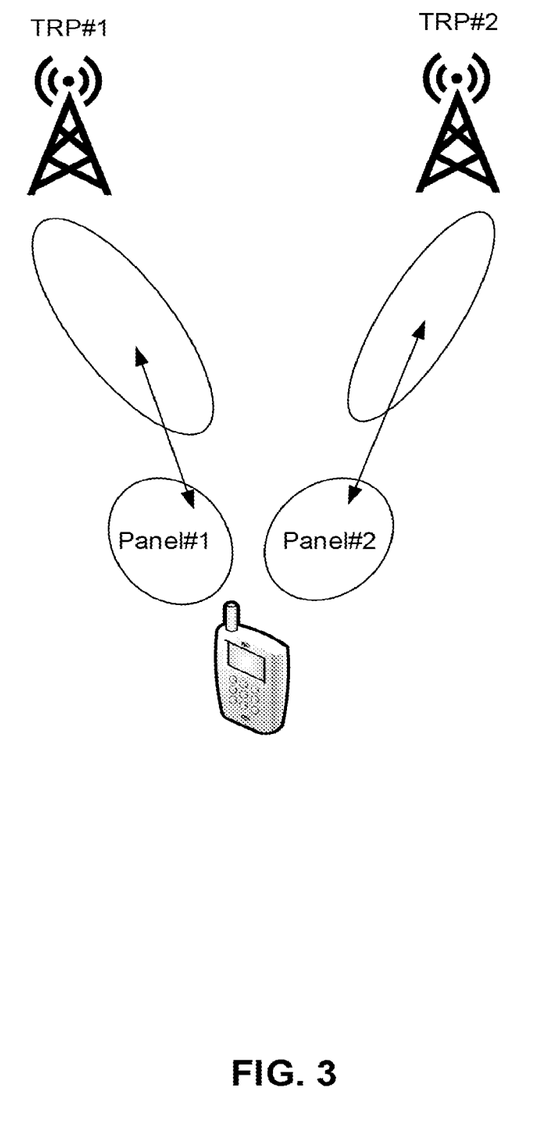
FIG. 3 is a schematic diagram illustrating panel-specific connection with different TRPs in accordance with example implementations of the present disclosure.

In multi-TRP transmission, a UE may be equipped with multiple panels and different UE panels may communicate with a RAN via different TRPs, as illustrated in FIG. 3. In addition, CORESET(s) configured to a UE may be grouped. In one implementation, the CORESET grouping is configured by a BS with radio resource control (RRC) signaling. In some implementations, the RRC singling includes a CORESET configuration indicating different values of a "CORESETPoolIndex" parameter, which could be interpreted as different CORESET groups/multiple CORESET groups are configured to the UE. In one implementation, individual PDSCHs are scheduled by CORESETs from individual CORESET groups by using fully/partially/non-overlapped physical resources for transmission.

Figure 4:
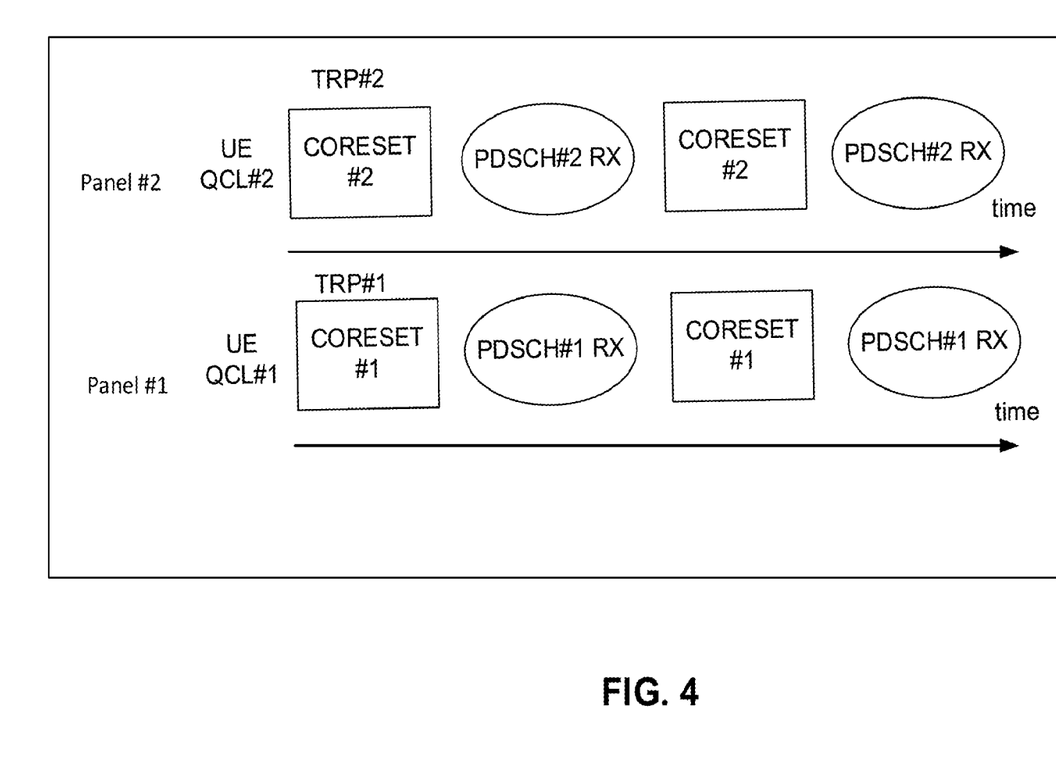
FIG. 4 is a schematic diagram illustrating a panel-specific default beam where two CORESET groups are configured, in accordance with example implementations of the present disclosure.

With reference to FIG. 4, the panel-specific default beam is determined according to the QCL type-D assumption of a CORESET group when the time offset between the reception of DCI in the PDCCH and the PDSCH reception is less than the threshold. In FIG. 4, two CORESET groups are configured to the UE with individual CORESET groups consisting of only one CORESET. It is noted that, in some implementations, a CORESET group is not limited to one CORESET, but also a plurality of CORESETs. In addition, the UE has capability of simultaneous reception with two QCL assumptions, so that each UE panel is associated with an individual QCL assumption. For example, QCL #1 is associated with panel #1, and QCL #2 is associated with panel #2. PDSCH #1 is scheduled via CORESET #1 and PDSCH #2 is scheduled via CORESET #2. Therefore, a PDSCH #1 default beam is determined according to the CORESET #1 and is not related to CORESET #2, and vice-versa for PDSCH #2. It is noted that "panel" is a conceptual term for UE antenna implementation. It is assumed that a panel is a basic unit for UE beamforming. A panel typically consists of a plurality of antenna elements. In one implementation, a beam can be formed by a panel and in order to form two beams simultaneously, two panels are needed. Such simultaneous beamforming from multiple panels is subject to UE capability.

In one implementation, the UE may assume that the DM-RS ports of the PDSCH are quasi co-located with the RS(s) with respect to the QCL parameter(s) for indicating PDCCH quasi co-location of the CORESET indicated by a monitored search space with the lowest CORESET-identifier (ID) in the latest slot in which one or more CORESETs within the active bandwidth part (BWP) of the CORESET group are monitored by the UE when the time offset between the reception of DCI in the PDCCH and the PDSCH reception is less than the threshold. A QCL-typeD assumption may be an example applied in the implementation above. That is, in terms of a panel-specific default beam for the PDSCH, a same QCL-typeD assumption of the QCL parameter(s) of the corresponding PDCCH is applied.

It is noted that the UE may report "multi-TRP" capability to the BS, so that the BS may configure the UE accordingly. The "multi-TRP" capability may be further associated with different UE capabilities, such as an enhancement for receiving transmission from multiple TRPs simultaneously via frequency division multiplexing (FDM) or space division multiplexing (SDM), for increasing an amount of PDCCH blind decoding, and for increasing a number of control channel elements (CCEs).

Furthermore, the "multi-TRP" capability may be interpreted as at least one of allowing one TCI code point in a DCI field to be associated with multiple TCI states, allowing simultaneous PDSCH transmission with physical resources being fully/partially/non-overlapped, and supporting a panel-specific default beam for the UE capable of simultaneous reception from multiple TRPs.

In some implementations, the UE may report "panel-specific default beam" capability to the BS. The "panel-specific default beam" capability may be interpreted as supporting the UE-based QCL assumption described earlier for UE capable of simultaneous PDSCH reception from multiple TRPs.

Therefore, a BS may trigger the UE to perform the QCL assumption derivation with an RRC configuration. For example, the BS transmits an RRC signal for configuring multiple CORESET groups (e.g. by the "CORESETPoolIndex" parameter) to the UE and this triggers the UE to perform QCL assumption derivation if the UE has reported "panel-specific default beam" capability to the BS. In one implementation, the UE may support "multi-TRP" capability, and the BS transmits an RRC signal indicating "multi-TRP" operation to the UE. In other implementations, the BS transmits an RRC signal indicating "panel-specific default beam" operation for PDSCH reception to the UE. In this way, when any combination of abovementioned RRC configuration(s) is received, the UE performs the abovementioned QCL assumption derivation when the time offset between the reception of DL DCI in the PDCCH and the PDSCH reception is less than a capability-related threshold (e.g. a "timeDurationForQCL" parameter).

In addition, the UE applies the same PDCCH beam for corresponding PDSCH reception, when scheduled by DCI format 1_0 and the time offset between the reception of the DL DCI and the corresponding PDSCH reception is equal to or greater than the capability-related threshold. In other implementations, the UE applies the indicated beam in the received DCI for the corresponding PDSCH reception when scheduled by DCI format 1_1 and the time offset between the reception of the DL DCI and the corresponding PDSCH reception is equal to or greater than the threshold.

In the present disclosure, a single PDCCH may be utilized to schedule individual PDSCHs from individual TRPs. To provide the UE with a QCL-typeD assumption for receiving PDSCHs corresponding to respective TRPs, a TCI code point in the DCI field may be associated with multiple TCI states. In addition, since there is only one PDCCH, the implicitly indicated Physical UL Control Channel (PUCCH) resource for Hybrid Automatic Repeat request (HARQ)-acknowledgment (ACK) bits transmission of the two scheduled PDSCH is semi-statically associated with the scheduling PDCCH. In this way, UE panels for transmitting the PUCCH resource and for receiving the scheduling PDCCH may not be dynamically associated. Therefore, a panel-specific PUCCH resource selection is required.

For panel-specific PUCCH resource selection, the information indicating where to find the PUCCH resource is provided in the received DCI, in a medium access control (MAC)-control element (CE), or is directly or indirectly related to a CORESET index or a CORESET group index which is utilized as an identifier for differentiating PUCCH resource groups or panels. Various cases are disclosed.

For panel-specific PUCCH resource selection via DCI signaling, a new or an existing DCI field in at least DCI format 1_0 and 1_1 may be used/reused for dynamically providing information to indicate a PUCCH resource group from which a PUCCH resource is selected for corresponding HARQ-ACK bit feedback. In one implementation, the existing DCI field may be an extension of a "PUCCH resource indicator" field. For example, a bit length of the "PUCCH resource indicator" field is extended and is applied as the most significant bit (MSB) or least significant bit (LSB) for group indication.

For panel-specific PUCCH resource selection via MAC-CE signaling, a new or an existing MAC-CE format may be applied/reused for providing information to indicate re-association of a PUCCH resource group to a "PUCCH resource indicator" field. For a received "PUCCH resource indicator" field in DCI, a PUCCH resource is selected from the associated PUCCH resource group indicated via the MAC-CE. The existing MAC CE format may be a reserved bit for indication. The new MAC CE format may be required of a new logical channel ID (LCID) for identifying the purpose for indicating re-association of a PUCCH resource group to the "PUCCH resource indicator" field.

In addition, a new or an existing MAC-CE format may be applied/reused for providing information to indicate re-association of a PUCCH resource to a PUCCH resource group. Therefore, for a received "PUCCH resource indicator" field in DCI, a PUCCH resource is selected from the associated PUCCH resource group indicated via the MAC-CE. The existing MAC CE format may use a reserved bit for indication. The new MAC CE format may be required of a new LCID for identifying the purpose for indicating re-association of a PUCCH resource group to the "PUCCH resource indicator" field.

Moreover, for either DCI-based or MAC-CE-based indication, the abovementioned information may be explicitly or implicitly linked to panel information or to PUCCH resource groups. In other words, the PUCCH resource groups and the panel information may be further associated explicitly or implicitly.

In one implementation, the information may be a CORESET index or a CORESET group index which is utilized as a direct or indirect identifier for differentiating PUCCH resource groups or panels.

In one implementation, the information provides a reference signal resource index which is associated with panel(s), such as sounding reference signal (SRS), channel state information (CSI)-reference signal (RS), synchronization signal block (SSB).

In one implementation, the information provides a reference signal resource set index which is associated with panel(s), such as an SRS resource set index and a CSI-RS resource set index.

In one implementation, the information indicates an antenna panel index directly. For example, the antenna panel index includes antenna elements which are connected to a same transceiver, antenna elements forming an antenna port, or antenna elements belonging to a same physical board.

In one implementation, the information indicates a TCI.

In other implementations, the information is associated with a subset of panel(s), where the subset of panel(s) is selected via other signaling, for example, MAC-CE.

Figure 5:
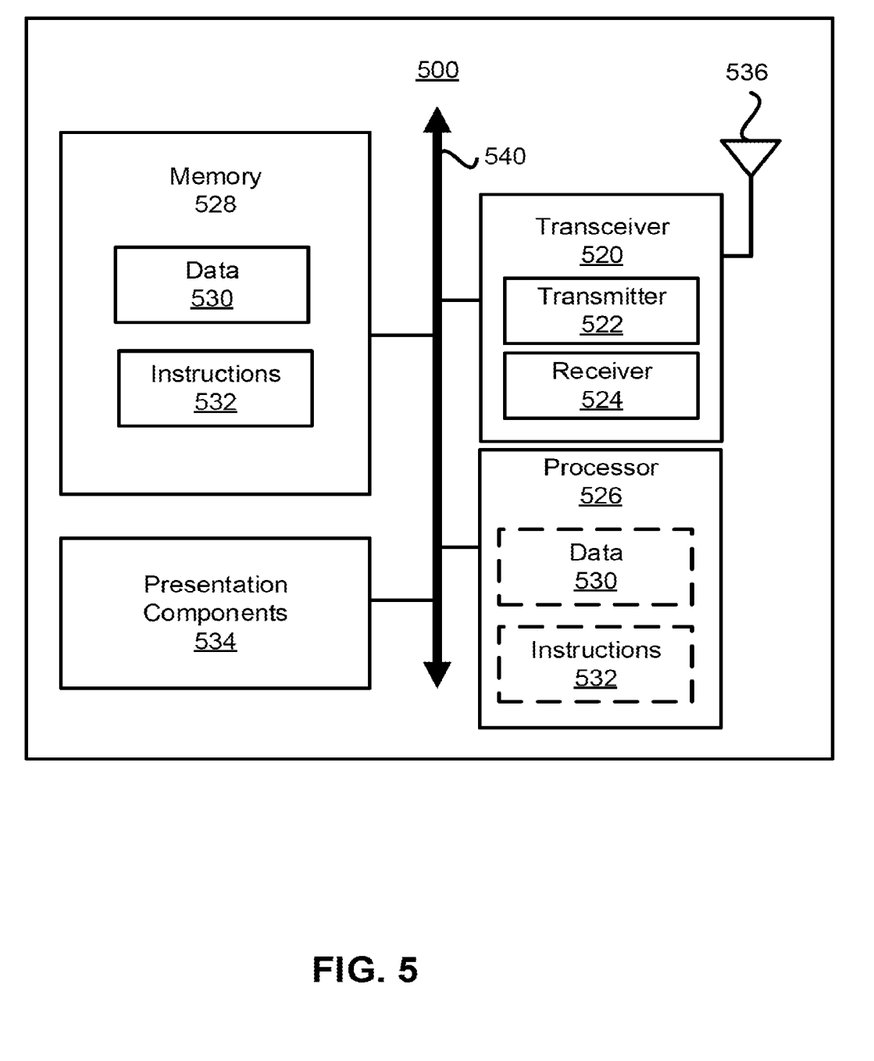
FIG. 5 is a block diagram illustrating a node for wireless communication, in accordance with example implementations of the present disclosure.

FIG. 5 illustrates a node 500 for wireless communication according to the present disclosure.

As illustrated in FIG. 5, the node 500 may include a transceiver 520, a processor 526, memory 528, one or more presentation components 534, and at least one antenna 536. The node 500 may also include an RF spectrum band module, a BS communications module, a network communications module, and a system communications management module, input/output (I/O) ports, I/O components, and a power supply (not shown). Each of these components may be in communication with each other, directly or indirectly, over one or more buses 540. The node 500 may be a UE or a BS that performs various disclosed functions as illustrated in FIG. 2.

The transceiver 520 includes a transmitter 522 (with transmitting circuitry) and a receiver 524 (with receiving circuitry) and may be configured to transmit and/or receive time and/or frequency resource partitioning information. The transceiver 520 may be configured to transmit in different types of subframes and slots including, but not limited to, usable, non-usable and flexibly usable subframes and slot formats. The transceiver 520 may be configured to receive data and control channels.

The node 500 may include a variety of computer-readable media. Computer-readable media may be any media that can be accessed by the node 500 and include both volatile and non-volatile media, removable and non-removable media. Computer-readable media may include computer storage media and communication media. Computer storage media includes both volatile and non-volatile, as well as removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not include a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. Communication media includes wired media such as a wired network or direct-wired connection, and wireless media such as acoustic, radio frequency (RF), infrared and other wireless media. Combinations of any of the disclosed media should be included within the scope of computer-readable media.

The memory 528 may include computer-storage media in the form of volatile and/or non-volatile memory. The memory 528 may be removable, non-removable, or a combination thereof. Memory includes solid-state memory, hard drives, and optical-disc drives. As illustrated in FIG. 5, the memory 528 may store computer-readable, computer-executable instructions 532 (e.g., software codes) that are configured to cause the processor 526 (e.g., processing circuitry) to perform various disclosed functions. Alternatively, the instructions 532 may be configured to cause the node 500 (e.g., when compiled and executed) to perform various disclosed functions.

The processor 526 may include an intelligent hardware device (e.g., a central processing unit (CPU), a microcontroller, an ASIC, etc.) The processor 526 may include memory. The processor 526 may process the data 530 and the instructions 532 received from the memory 528, and information received via the transceiver 520, the base band communications module, and/or the network communications module. The processor 526 may also process information to be sent to the transceiver 520 for transmission via the antenna 536, to the network communications module for transmission to a CN.

One or more presentation components 534 present data to a person or other device. Presentation components 534 include a display device, speaker, printing component, and vibrating component.

From the previous disclosure, it is evident that various techniques can be utilized for implementing the concepts of the present disclosure without departing from the scope of those concepts. Moreover, while the concepts have been described with specific reference to certain implementations, a person of ordinary skill in the art would recognize that changes can be made in form and detail without departing from the scope of those concepts. As such, the disclosure is to be considered in all respects as illustrative and not restrictive. It should also be understood that the present disclosure is not limited to the particular described implementations, but that many rearrangements, modifications, and substitutions are possible without departing from the scope of the present disclosure.

What is claimed is:

1. A method of deriving a Quasi-Colocation (QCL) assumption in multi-panel transmission for a user equipment (UE), the method comprising:
   reporting, to a network of a wireless communication system, capabilities of supporting: a multi-transmit-receive-point (multi-TRP) operation for supporting simultaneous reception from multiple TRPs, and a panel-specific default beam for at least one physical downlink shared channel (PDSCHD) reception;
   receiving a configuration comprising a plurality of control resource set (CORESET) groups from the each CORESET group corresponding to a different TRP;
   receiving a physical downlink control channel (PDCCH) scheduling a physical downlink shared channel (PDSCH) associated with a first TRP of the multiple TRPs;
   determining a default QCL assumption for demodulation reference signal (DM-RS) port(s) of the PDSCH scheduled by the PDCCH according to a CORESET of one of the plurality of CORESET groups associated with the first TRP, in response to a time offset between a reception of downlink control information (DCI) in the scheduling PDCCH and the PDSCH reception being less than a threshold; and
   applying the default QCL assumption for reception of the DM-RS port(s) of the PDSCH.

2. The method of claim 1, wherein the default QCL assumption includes a QCL type-D parameter.

3. The method of claim 1, wherein the plurality of CORESET groups is configured by the network to the UE through radio resource control (RRC) signaling including a CORESET configuration indicating different values of a CORESETPoolIndex parameter.

4. The method of claim 1, wherein determining the default QCL assumption comprises:
   determining that the default QCL assumption is associated with QCL parameter(s) utilized for PDCCH QCL indication of a CORESET indicated via a monitored search space with a lowest CORESET index of the one of the plurality of CORESET groups associated with the first TRP in a latest slot within an active bandwidth part (BWP) of a serving cell when the time offset between the reception of the DCI in the scheduling PDCCH and the PDSCH reception is less than the threshold.

5. The method of claim 1, wherein the threshold includes a timeDurationForQCL parameter.

6. The method of claim 1, wherein the determining the default QCL assumption comprises:
   determining a first default QCL assumption for a first DM-RS port(s) of a first PDSCH reception scheduled by a first PDCCH according to a first CORESET group of the plurality of CORESET groups; and
   determining a second default QCL assumption for a second DM-RS port(s) of a second PDSCH reception scheduled by a second PDCCH according to a second CORESET group of the plurality of CORESET groups.

7. The method of claim 1, wherein the reported capability includes information related to one of receiving transmission from multiple TRPs simultaneously according to frequency division multiplexing (FDM) or space division multiplexing (SDM), and allowing simultaneous PDSCH reception with corresponding physical resources being fully, partially or non-overlapped with each other.

8. The method of claim 1, wherein the default QCL assumption is applied when radio resource control (RRC) signaling for enabling at least one of panel-specific default beam and multi-TRP operation is received from the network.

9. A user equipment (UE) comprising:
   a transceiver;
   one or more non-transitory computer-readable media containing computer-executable instructions embodied therein; and
   at least one processor coupled to the transceiver and the one or more non-transitory computer-readable media, the computer-executable instructions causing the UE to:
   report, via the transceiver, to a network of a wireless communication system, capabilities of supporting: a multi-transmit-receive-point (multi-TRP) operation for supporting simultaneous reception from multiple TRPs, and a panel-specific default beam for at least one physical downlink shared channel (PDSCH) reception;
   receive, via the transceiver, a configuration comprising a plurality of control resource set (CORESET) groups from the network, each CORESET group corresponding to a different TRP;
   receive, via the transceiver, a physical downlink control channel (PDCCH) scheduling a physical downlink shared channel (PDSCH) associated with a first TRP of the multiple TRPs;
   determine a default QCL assumption for demodulation reference signal (DM-RS) port(s) of the PDSCH scheduled by the PDCCH according to a CORESET of one of the plurality of CORESET groups associated with the first TRP, in response to a time offset between a reception of downlink control information (DCI) in the scheduling PDCCH and the PDSCH reception being less than a threshold; and apply the default QCL assumption for reception of the DM-RS port(s) of the PDSCH.

10. The UE of claim 9, wherein the default QCL assumption includes a QCL type-D parameter.

11. The UE of claim 9, wherein the plurality of CORESET groups is configured by the network to the UE through radio resource control (RRC) signaling including a CORESET configuration indicating different values of a CORESET-PoolIndex parameter.

12. The UE of claim 9, wherein the computer-executable instructions further cause the UE to, in determining the default QCL assumption:
determine that the default QCL assumption is associated with QCL parameter(s) utilized for PDCCH QCL indication of a CORESET indicated via a monitored search space with a lowest CORESET index of the one of the plurality of CORESET groups associated with the first TRP in a latest slot within an active bandwidth part (BWP) of a serving cell when the time offset between the reception of the DCI in the scheduling PDCCH and the PDSCH reception is less than the threshold.

13. The UE of claim 9, wherein the threshold includes a timeDurationForQCL parameter.

14. The UE of claim 9, wherein the computer-executable instructions further cause the UE to, in determining the default QCL assumption:
determine a first default QCL assumption for a first DM-RS port(s) of a first PDSCH reception scheduled by a first PDCCH according to a first CORESET group of the plurality of CORESET groups; and
determine a second default QCL assumption for a second DM-RS port(s) of a second PDSCH reception scheduled by a second PDCCH according to a second CORESET group of the plurality of CORESET groups.

15. The UE of claim 9, wherein the reported capability includes information related to one of receiving transmission from multiple TRPs simultaneously according to frequency division multiplexing (FDM) or space division multiplexing (SDM), and allowing simultaneous PDSCH reception with corresponding physical resources being fully, partially or non-overlapped with each other.

16. The UE of claim 9, wherein the default QCL assumption is applied when radio resource control (RRC) signaling for enabling at least one of panel-specific default beam and multi-TRP operation is received from the network.

* * * * *